United States Patent [19]

Yamamoto

[11] Patent Number: 5,253,155
[45] Date of Patent: Oct. 12, 1993

[54] CIRCUIT AND METHOD FOR CONTROLLING OUTPUT CURRENT BALANCE BETWEEN PARALLEL DRIVEN PWM-TYPE POWER INVERTING UNITS

[75] Inventor: Yasuhiro Yamamoto, Tokyo, Japan

[73] Assignee: Kabushiki Kaisha Meidensha, Tokyo, Japan

[21] Appl. No.: 887,141

[22] Filed: May 22, 1992

[30] Foreign Application Priority Data

Jul. 23, 1991 [JP] Japan .................................. 3-182170

[51] Int. Cl.$^5$ .......................................... H02M 7/5395
[52] U.S. Cl. .......................................... 363/71; 363/41
[58] Field of Search ............................ 363/41, 64, 71; 318/811

[56] References Cited

U.S. PATENT DOCUMENTS

| | | | |
|---|---|---|---|
| 4,802,079 | 1/1989 | Mizoguchi | 363/71 |
| 4,882,120 | 11/1989 | Roe et al. | 363/98 |
| 5,016,158 | 5/1991 | Matsui et al. | 363/71 |
| 5,191,518 | 3/1993 | Recker et al. | 363/71 |

FOREIGN PATENT DOCUMENTS

| | | |
|---|---|---|
| 3602496 | 7/1987 | Fed. Rep. of Germany . |
| 3816444 | 12/1988 | Fed. Rep. of Germany . |
| 4023207 | 4/1991 | Fed. Rep. of Germany . |
| 22385 | 2/1982 | Japan .................................. 363/71 |

Primary Examiner—William H. Beha, Jr.
Attorney, Agent, or Firm—Foley & Lardner

[57] ABSTRACT

A circuit and method for controlling an output current balance for parallel driven PWM-type digitalized power inverting units are disclosed in which a feedback control such that rising edge times and falling edge times of a PWM waveformed pulse train signal to be supplied to the parallel driven power inverting units are respectively corrected using independent correction signals is carried out to eliminate a deviation between output currents of the parallel driven power inverting units. The correction of the rising edge times and falling edge times is such that a phase advance correction for the one unit with respect to an offset value delay and a phase retardation correction for the other unit with respect to the offset value delay are carried out so that a delay of an average output current with respect to the PWM waveformed pulse train signal is made constant. In addition, if an integration calculation of the feedback control is carried out during a constant period of time upon a change in the PWM waveformed pulse train signal to suppress an abnormal integration. Ripple components due to a generation of output current unbalance can be suppressed by limiting the corrections to the falling edges and rising edges of the PWM pulse train signal to either one according to a polarity of the deviation between the output currents of the power inverting units.

15 Claims, 14 Drawing Sheets

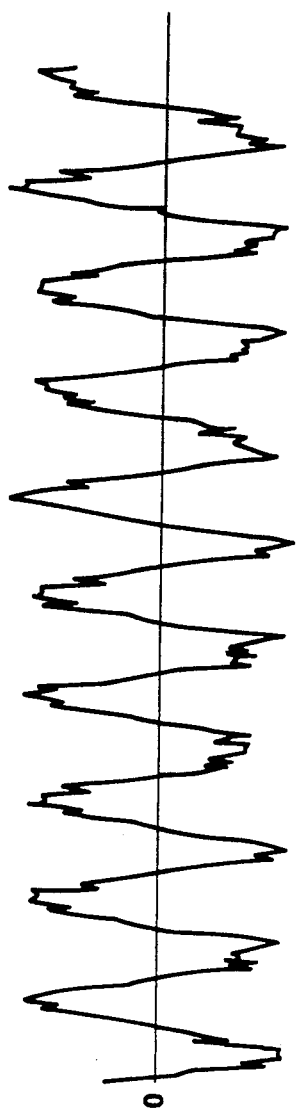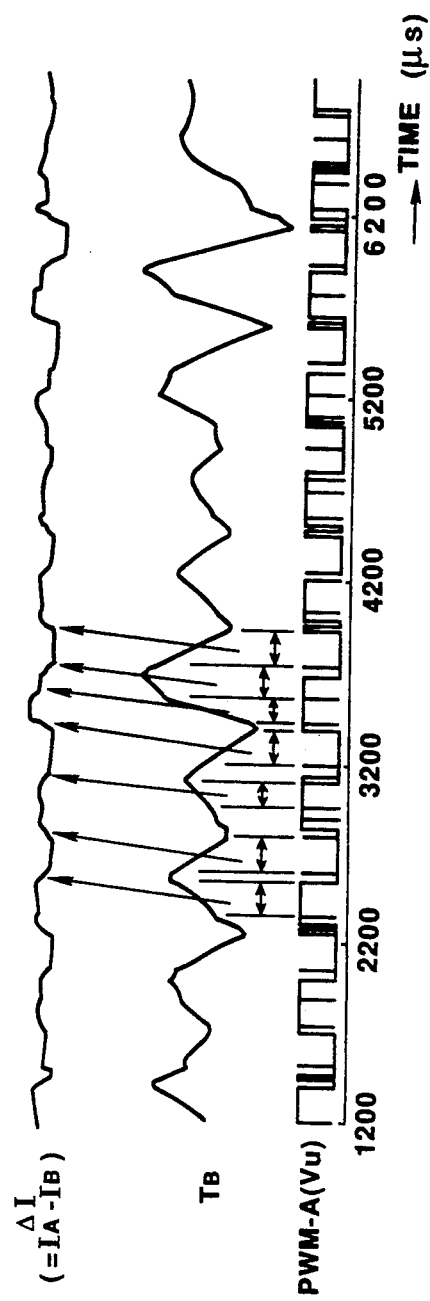
FIG.16(A)
FIG.16(B)
FIG.16(C)

CIRCUIT AND METHOD FOR CONTROLLING OUTPUT CURRENT BALANCE BETWEEN PARALLEL DRIVEN PWM-TYPE POWER INVERTING UNITS

BACKGROUND OF THE INVENTION (1) Field of the invention

The present invention relates to parallel driven PWM (Pulse Width Modulation)-type power inverting units and, particularly, to a circuit and method for controlling an output current balance applicable to output current balancing of output currents derived from both or plural parallel driven PWM-type power inverting units so as to eliminate a deviation between output currents derived from both parallel driven power inverting units.

(2) Description of the background art

Semiconductor devices such as transistors, SCR, etc. are commonly used as switching elements of a main circuit of a single power inverter and/or converter. The inverter and converter generally constitute a power inverting unit from alternating currents to direct currents. In order to provide a high capacity for the whole power inverting unit, a plurality of power inverting units are driven in parallel to one another (simultaneously).

When the parallel drive for the power inverting units is carried out, output currents from the plural power inverting units become often unbalanced to each other due to variations in switching element characteristics internal of the respective power units and, in worst case, cross currents are generated between the respective units.

The term cross current generally means a circulation current flowing through respective windings of both electric equipments due to a difference in an induced electromotive force between both electric equipments in a case where both electric equipments are driven in parallel.

Main causes of generating such an output current unbalance as described above may be listed as follows: a difference in wiring impedance between both power inverting units; a difference in on voltages of the respective switching elements; a time difference of dead times added to prevent simultaneous on between upper and lower arms in the main circuits of the respective power inverting units; and a difference between storage times in the switching elements used in both power inverting units.

Output current unbalancing problem due to the difference in wiring impedance can be solved by rearranging the wiring between each element of the respective power inverting units to reduce in errors of the wiring impedances. In addition, the unbalancing due to the difference in dead times can be solved by digitalizing the whole circuitry in each power inverting unit.

The output current unbalancing problem due to the differences in the on voltages of the switching elements and their storage times can slightly be suppressed by selections of the excellent performance switching elements themselves. However, this method cannot cope with temperature variations between the individual switching elements.

FIG. 1 shows partial output circuits of one-phase main circuit of previously proposed parallel driven inverting units.

FIG. 2 shows situations how variations occur in switching times of transistors used as switching elements, particularly, how current errors due to the difference in storage times of the switching elements are generated in the case shown in FIG. 1 in which the output currents flow positively into an interphase reactor.

FIG. 3 shows situations how variations occur in switching times of transistors used as switching elements, particularly, how current errors due to the difference in storage times of the switching elements are generated in the case shown in FIG. 1 but in a case where the output currents $I_A$ and $I_B$ negatively flow out of the interphase reactor.

In both of FIGS. 2 and 3, on times and dead times are all the same for the described transistors shown in FIG. 1 and only the storage times $T_{SUA}$, $T_{SUB}$, $T_{SXA}$, $T_{SXA}$, and $T_{SXB}$ are changed according to their external circumstances.

These differences in storage times cause output voltages of $V_A$ and $V_B$ to produce an error voltage of $V_{A-VB}$. In addition, the current unbalance between the output currents $I_A$ and $I_B$ is generated.

As shown in FIGS. 4 and 5, a current balance is achieved by a current feedback control method applied to the parallel driven power inverting units.

That is to say, in FIG. 4, in order to drive two inverters 1 and 2 in parallel, each of the two inverters having a current control system (ACR: Automatic Current Regulator) and a PWM inverting circuit (PWM), the same current command is issued to the respective current control amplifiers and the output current for each inverter 1, 2 is feedback controlled to the current command.

In the case of FIG. 5, an output of a deviation amplifier 4 which detects only an unbalanced component of the output currents is used to feedback control for an output of the current control amplifier (ACR) 3.

In the former method of FIG. 4, since no current command itself is present in an open loop control such as a V/F (voltage/frequency) drive type inverter, the output current balancing method cannot physically be realized any more.

In the latter method of FIG. 5, since a balance control circuit is inserted in a subsequent stage of each inverter, conventional various circuits can be applied thereto.

FIG. 6 shows a previously proposed current balance control circuit having a specific circuit construction applicable to the current balance circuit in the case of FIG. 5.

In FIG. 6, the previously proposed current balance control circuit includes a PWM control circuit having: a PWM command generator 5 which outputs an analog signal (sinusoidal wave); a PWM carrier oscillator 6 which outputs a triangular wave; and comparators 7, 8 which compare both levels of the output signals from the PWM command generator 5 and PWM carrier oscillator 6, respectively.

Gate signals $V_A$, $V_B$ of the PWM waveforms which serve as outputs of the comparators 7 and 8 are input to the main circuits 9, and 10 including dead time generators and base drivers so as to provide PWM outputs PWM-A and PWM-B for the respective inverter main circuits 9, 10.

The outputs of both main circuits of inverters 9, 10 are supplied to an induction motor 12 which serves as a load via an interphase reactor 11.

To achieve the current balance, a difference in the output currents of the main circuits 9, 10 of the inverters 9, 10 is detected by means of the deviation amplifier 4, the deviation causing the output of the PWM command generator 5 to be increased or to be decreased and the increase or decrease being in conformity to polarity of the deviation.

FIG. 7 shows waveforms appearing on the current balance control circuit shown in FIG. 6.

If a difference exists between analog command voltages $V_a$, $V_b$ of the PWM waveform outputs $V_A$, $V_B$ from the comparators 7, 8 with respect to the output voltage V from the PWM command generator 5, i.e., the unbalance of the positive currents is present, the output of the deviation amplifier 4 causes the analog voltage $V_b$ to the comparator 8 to be increased and causes the analog voltage $V_a$ to the comparator 7 to be decreased. Together with decreasing a plusewidth of the output PWM-A of the inverter main circuit 9 (hatched portion of FIG. 7), the pulsewidth of the output PWM-B of the inverter main circuit 10 is increased as denoted by the hatch portion of FIG. 7. Consequently, the inverter output currents can be balanced.

However, in the previously proposed current balance method described above, the balance compensation is carried out in an analog system. The previously proposed current balance method cannot be applied to digitalized inverters nor converters in which a microcomputer is used in an essential part of control portion and self-contained PWM control ICs are used.

For example, an addition and/or subtraction of a balance compensated signals to and/or from the PWM commands cannot be carried out due to the presence of analog circuits in such inverters as those using the PWM control digital ICs. In addition, if the balance compensated signals are input into the internal of a CPU (Central Processing Unit) of the microcomputer via an A/D (Analog/Digital) converter, wasteful times are consumed to convert the analog signal to the corresponding digital signal and for the CPU to calculate and process the digitally processed operations, Consequently, such a method as described above cannot be reduced into practice in terms of their inherent responsive characteristics.

SUMMARY OF THE INVENTION

It is, therefore, an object of the present invention to provide a current balancing control circuit applicable to parallel driving digitalized PWM type power inverting units which can achieve more assured and easier current balancing for output currents of the parallel driven digitalized power converting units and which does not give influence on dead time compensation and output current control operations.

The above-described object can be achieved by providing a current balance control circuit for parallel driven PWM-type power inverting units which are connected to each other to supply power to a load, comprising: a) a PWM pulse generator which generates a PWM pulse train signal and outputs the PWM pulse train signal to each main circuit of the power inverting units, each main circuit thereof outputting a current to the load via an interphase reactor; b) a pair of series-connected retard correction circuits interposed between the PWM pulse generator and each main circuit of the power inverting units, for independently retarding rising edges and falling edges of the PWM pulse supplied to a corresponding one of the main circuits by predetermined retardation times, respectively, in response to each retardation correction signal; and c) a retardation correction signal generator which calculates a proportion and integration of a deviation between each output current from the main circuits of the power inverting units and generates and outputs one of the retardation correction signals to one of the pair of retard correction circuits so that, when the PWM pulse train signal from the PWM pulse generator to be supplied to the main circuits of the power inverting units rises, a rising edge of the PWM pulse train signal supplied to one of the main circuits of the respective power inverting units which output the current having a value larger than that of the other power inverting unit is retarded by the predetermined retardation time with respect to the rising edge of the PWM pulse train signal to be supplied to the other main circuit of the other inverting unit which outputs the current which is smaller than that of the one power inverting unit and a falling edge of the PWM pulse train signal supplied to the other main circuit of the other power inverting unit which outputs the current having a value smaller than that of the one power inverting unit is, in turn, retarded by the predetermined retardation time with respect to the falling edge of the PWM pulse train signal to be supplied to the one main circuit of the one inverting unit which outputs the current which is larger than that of the other power inverting unit.

The above-described object can also be achieved by providing a method for controlling an output current balancing for parallel driven PWM type power inverting units as set forth in claim 11, wherein said step c) includes the steps of: j) adding the result of proportion and integration calculations of the deviation between output currents of the respective main circuits to an offset signal only during a negative polarity indicating interval of time of the output current derived from one of the main circuits which outputs the larger current so as to retard the rising edges of the PWM control signal to be supplied to the one main circuit which output the larger current; and k) adding the result of proportion and integration calculations of the deviation between output currents of the respective main circuits to an offset signal only during a positive polarity indicating interval of time of the output current derived from the other main circuit which outputs the smaller current so as to retard the falling edges of the PWM control signal to be supplied to the other main circuit which outputs the smaller current.

BRIEF DESCRIPTION OF THE DRAWINGS

FIGS. 16(A), 16(B), and 16(C) are waveform charts for explaining operation in the circuit shown in FIG. 14.

DETAILED DESCRIPTION OF THE PREFERRED EMBODIMENTS

Reference will hereinafter be made to the drawings in order to facilitate a better understanding of the present invention.

FIGS. 1 through 7 have already been explained in the BACKGROUND OF THE INVENTION.

Figure 8:
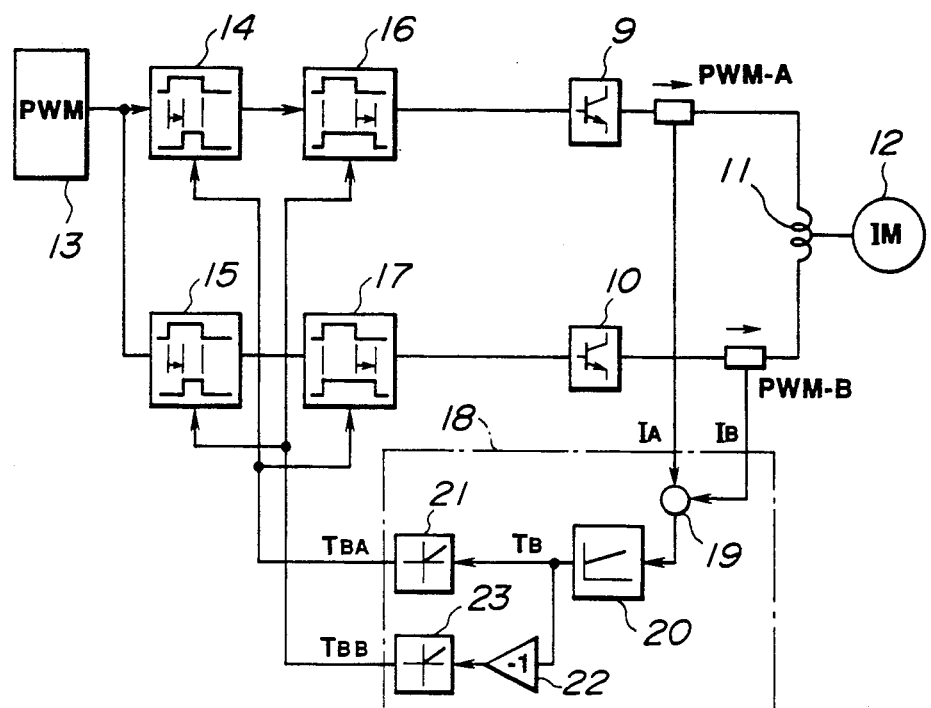
FIG. 8 is a circuit block diagram of a first preferred embodiment of a current balance control circuit according to the present invention.

FIG. 8 shows a first preferred embodiment of a current balancing circuit according to the present invention.

In FIG. 8, a PWM (Pulse Width Modulation) command generator 13 calculates a period and width of a PWM pulse in response to a voltage command and frequency command derived from a controller (not shown) and generates a PWM waveformed pulse train signal.

Pulse rising edge correctors 14, 15 delay rising times of the respective pulses of the PWM waveformed pulse train signal from the PWM command generator 13 as appreciated from FIG. 8.

Pulse falling edge correctors 16, 17 delay falling times of the respective pulses of the PWM waveformed pulse train signal from the PWM command generator 13 as appreciated from FIG. 8. Thus, the currents fed to main circuits 9, 10 of the inverters are corrected.

It is noted that correction signals denoted by $T_{BA}$ and $T_{BB}$ are supplied to the respective pulse rising edge and falling edge correctors 14, 15, 16, and 17 for controlling the delay times of the respective rising edge and falling edge correctors 14, 15, 16, and 17. These correction signals are derived according to a deviation magnitude and polarity of the output current in the inverter main circuits 9, 10 as will be described below.

A delay correction control circuit 18 includes: a deviation detection circuit 19 which detects a deviation quantity of the output currents from both main circuits of the inverters 9, 10; a deviation control amplifier 20 which calculates a proportion (P)/integration (I) of the detected deviation detection signal from the deviation detection circuit 19 so as to output a delay control signal $T_B$; a positive polarity amplifier 21 which achieves a value proportional to the signal $T_B$ only when the delay control signal $T_B$ is in the positive polarity as the delay correction control signal $T_B$; an inverting amplifier 22 which polarity inverts the delay control signal $T_B$; and a positive polarity amplifier 23 which outputs a value proportional to the signal $-T_B$ only when the inverted output signal $-T_B$ is in a positive polarity as the delay correction signal $T_{BB}$.

As described above, the delay correction control circuit 18 provides the delay control signal $T_{BA}$ or $T_{BB}$ corresponding to deviation and polarity of output currents of the main circuits of the inverters 9, 10. When the output current of the main circuit of the inverter 9 indicates a higher value than that of the counterpart inverter 10, the signal $T_{BA}$ is used so that a rising delay is carried out by means of the pulse rising edge correction circuit 14, the output current of the inverter main circuit 9 is descreased, and the output current of the inverter main circuit 10 is increased. Similarly, whenever the PWM waveformed pulse train signal falls, the falling edge delay is carried out by means of the falling edge correction circuit 17. Such a correction control as described above achieves the current balancing according to the decrease in the output current from the main circuit 9 and according to the increase in the output current from the main circuit 9.

On the contrary, when the output current of the main circuit 9 indicates a lower value than that of the main circuit 10, the delay correction signal is used so that the current balancing can be achieved by means of rising edge delay of the rising edge delay correction circuit 16.

In the above-described method of controlling the current balance shown in FIG. 8, the rising edge delay (pulsewidth decrease) on one of the inverter main circuit is carried out and, simultaneously, the falling edge delay (pulsewidth increase) on the other inverter main circuit is carried out. Since switching on and off in both inverter main circuits cause the output voltages thereof indicate different polarities, the inverter output voltage is maintained by retarding the output currents by $T_{BA}$ ($T_{BB}$) during the switching on of the one inverter main circuit and by advancing the output currents by $T_{BA}$ ($T_{BB}$) during the switching off of the one inverter main circuit.

At this time, since it is impossible to advance the PWM waveform due to a retroaction to the time, the same action and effect can be achieved by the retardation of the PWM waveformed pulse train signal fed to the other inverter main circuit in place of the advance to the PWM waveformed pulse train signal.

Figure 6:
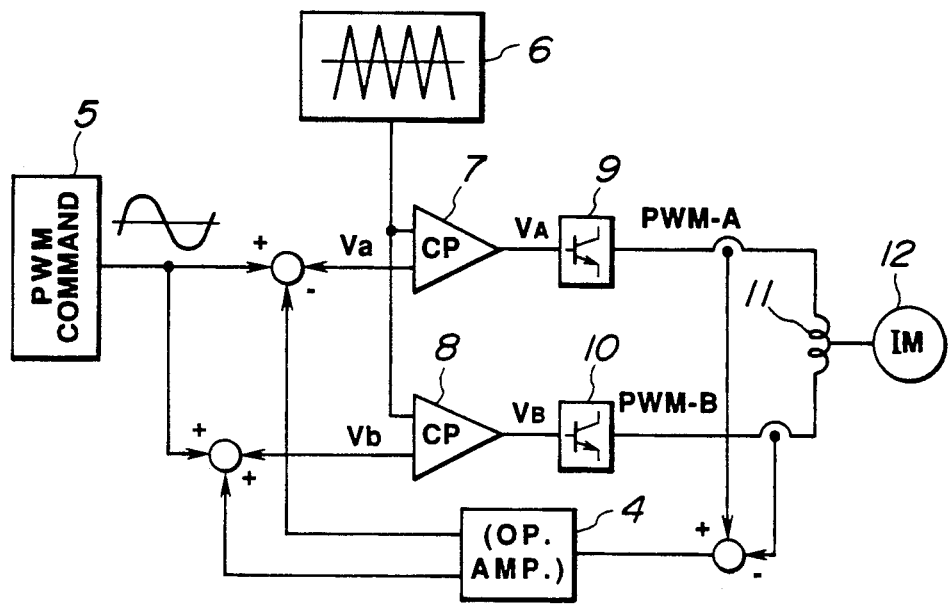
FIG. 6 is a specific circuit block diagram of the other previously proposed current balance control circuit shown in FIG. 5 and described in the BACKGROUND OF THE INVENTION.
Figure 7:
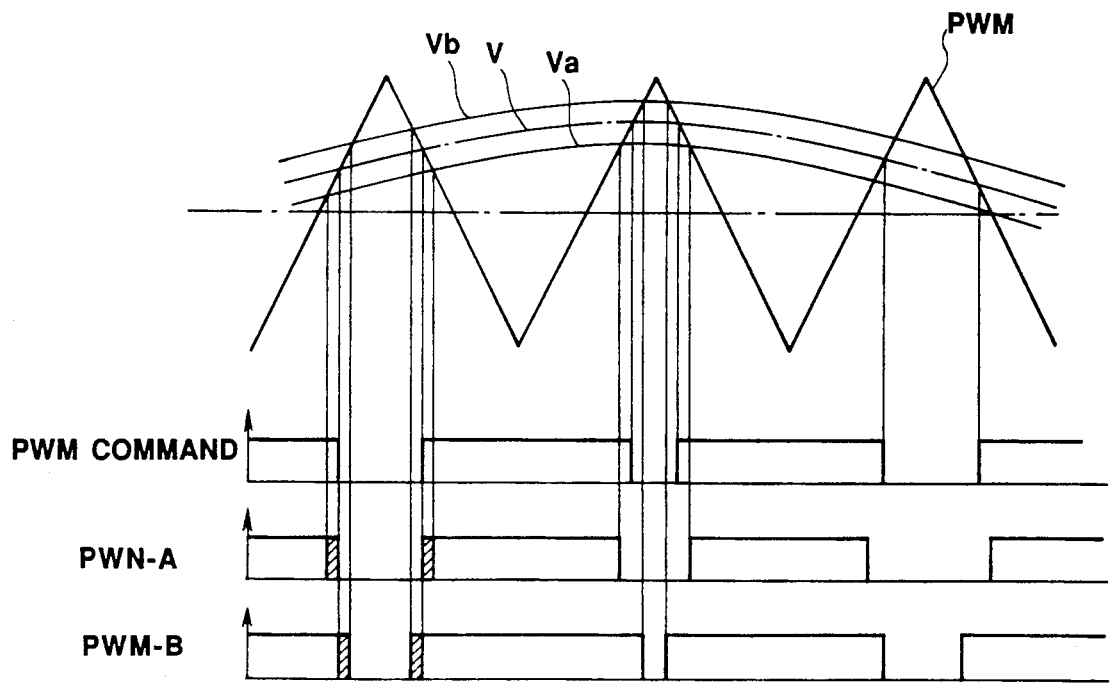
FIG. 7 is waveform timing charts of output currents and PWM command in the previously proposed current balance control circuit shown in FIG. 6 for explaining corrections of the output currents PWM-A, PWM-B to balance the output currents in the case shown in FIG. 6.

In details, since in the previously proposed analog current balance circuit shown in FIGS. 6 and 7, the current balanced correction can be feedback to a voltage command before the generation of the PWM waveformed pulse train signal in the PWM generator, a phase of the PWM waveformed pulse train signal fed to one inverter unit can be retarded by a time and the phase thereof fed to the other inverter unit can be advanced by the same time. Consequently, the output voltage in which the phase advance and phase delay are synthesized indicates the same PWM (command) before the correction.

On the other hand, the current balance control circuit shown in FIG. 8, a timer circuitry is used to control the current balancing so that no phase advance function is provided in the current balance control circuit shown in FIG. 8. Therefore, although the advance to retardation should be corrected in the reverse polarity, only a delay component for one inverter main circuit is feedback. In the way described above, since the PWM waveformed pulse train signal is not delayed for one inverter main circuit but delayed for the other inverter main circuit, a phase deviation of the synthesized voltage is generated by ½ the delay time but the current unbalance can be suppressed.

FIGS. 9(A) through 9(D) show waveform timing charts of respective output signals from the essential circuit blocks in the current balance control circuit shown in FIG. 8.

As shown in FIGS. 9(B) and 9(C), hatched portions of $T_{BA}$ denotes time regions corrected in the current balancing method described in the first preferred embodiment.

Figure 10:
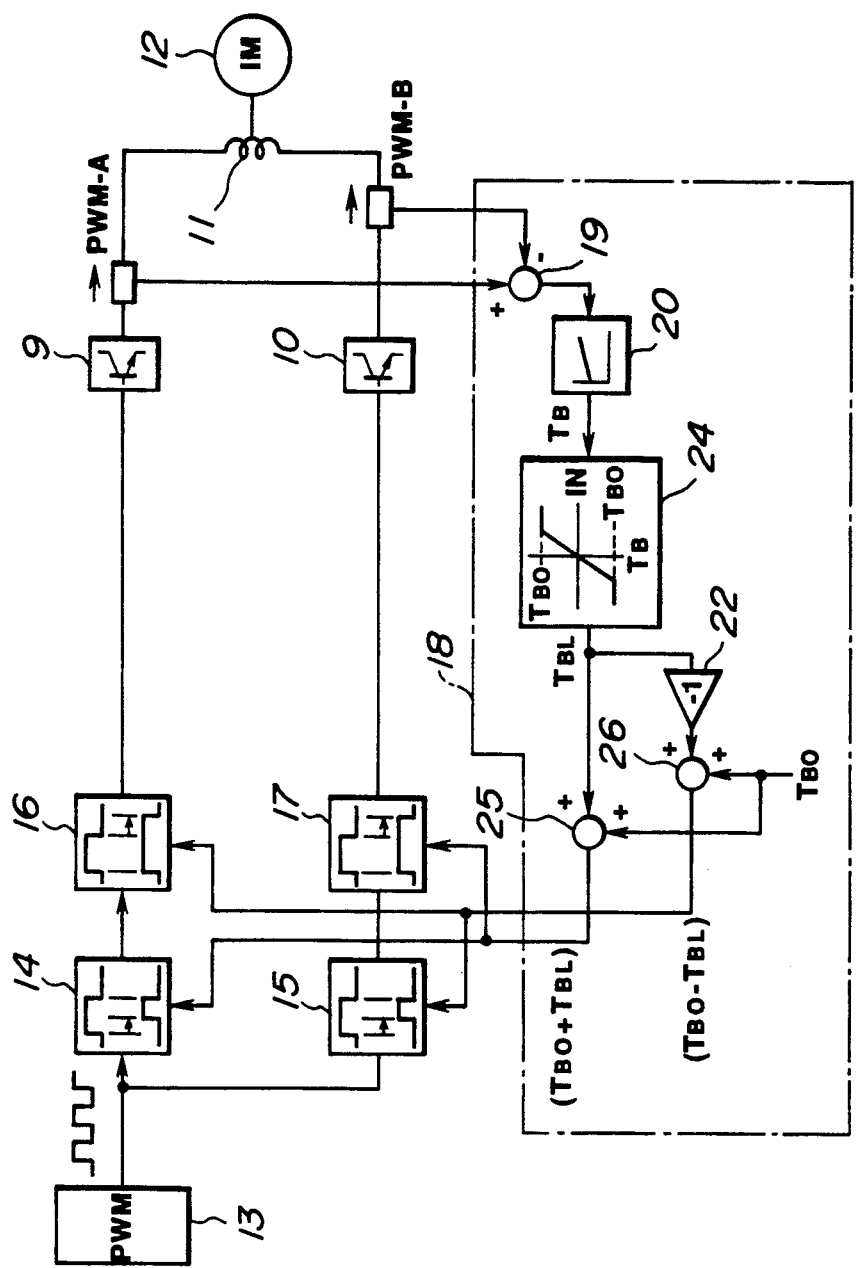
FIG. 10 is a circuit block diagram of a second preferred embodiment of a current balance control circuit according to the present invention.
Figure 11:
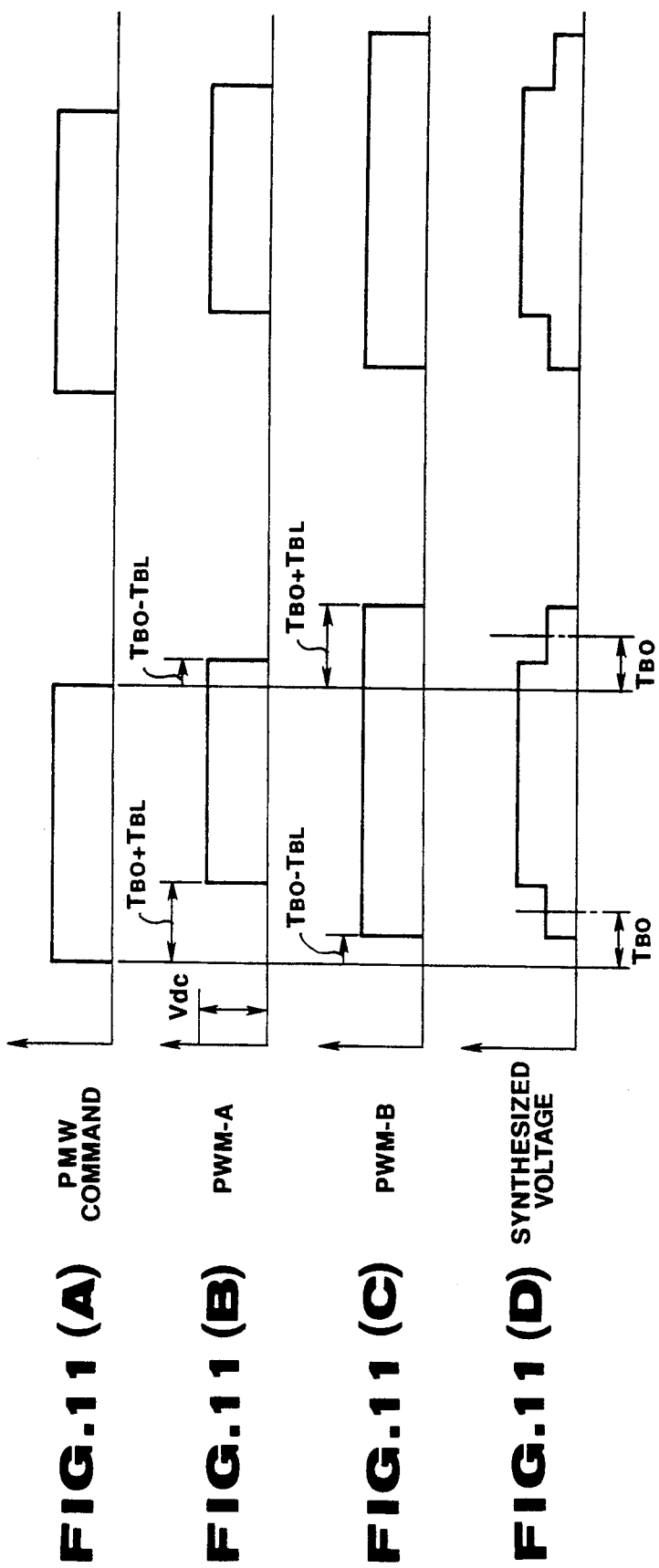
FIGS. 11(A), 11(B), 11(C), and 11(D) are waveform charts of the output currents of the second preferred embodiment shown in FIG. 10.

FIG. 10 shows a second preferred embodiment of the current balancing circuit according to the present invention.

In the second preferred embodiment shown in FIG. 10, the rising edge and falling edge of the synthesized voltage in response to the command of the PWM pulse train signal are always provided with fixed time delays so that the pulsewidth of the synthesized voltage itself does not receive an influence of the current balance delay.

It is noted that a limiter 24 is installed at a subsequent stage to the deviation control amplifier 20 as is different from FIG. 8 and adders 25, 26 are installed in place of the positive polarity amplifiers 21, 23.

As appreciated from the content of the block denoted by 24, the limiter 24 serves to provide a delay control signal $T_{BL}$ in which the delay control signal $T_B$ derived from the deviation control amplifier 20 is limited by both limit values of different polarities. One of the adders 25 adds an offset signal $T_{BO}$ to the delay control signal $T_{BL}$ to provide the correction signal of $T_{BO}+T_{BL}$.

On the other hand, the other adder 26 adds the offset signal $T_{BO}$ to a minus delay control signal $-T_{BL}$ to provide $T_{BO}-T_{BL}$.

In the second preferred embodiment, the offset signal $T_{BO}$ is used to cause the PWM waveformed pulse train signal supplied to both inverter main circuits 9, 10 to delay by the corresponding time duration of the offset signal $T_{BO}$. If the current unbalance occurs, the offset signal $T_{BO}$ is added to the control signal $T_{BL}$ so as to provide delay in the increase direction for the PWM pulse train signal to one inverter main circuit or to provide delay in the decrease direction to the other main circuit for the PWM pulse train signal to the other main circuit. Thus, the equivalent action and effect as the phase delay and phase advance in the PWM waveformed pulse train signal. At this time, since such a condition that the control signal $T_{BL}$ ($T_B$) is smaller in magnitude than the offset signal $T_{BO}$ is established, the control signal $T_B$ is limited to $\pm T_{BO}$ by means of the limiter 24.

It should be noticed that in the second preferred embodiment the delay time of the synthesized output voltage for the PWM command becomes constant even at the time of rising edge of the PWM waveformed pulse train signal, at the time of falling edge thereof, and at a time when the control signal $T_B$ is varied.

Consequently, although the PWM phase deviation occurs, the pulsewidth as commanded is obtained. This can prevent the current balance control from having an ill influence such as an error generating on a dead time compensation operation.

In addition, for a PWM synchronization current sampling to carry out the output current control, the delay in the PWM waveformed signal can always be set to a constant value $T_{BO}$. Therefore, this results in no ill influence on a current detection accuracy.

Figure 9:
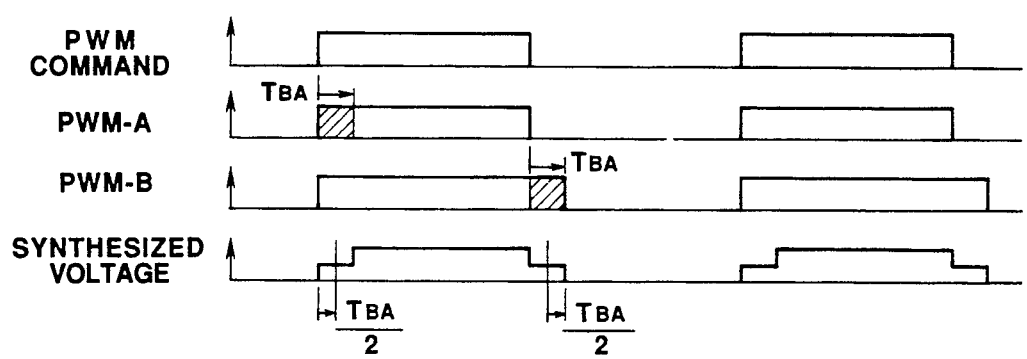
FIG. 9 is waveform timing charts of output signals in the current balance control circuit shown in FIG. 8.

In details, in the first preferred embodiment, the synthesized voltage waveform shown in FIG. 9 is delayed in time equivalent to a half time of the control signal $T_{BA}$. This delay is varied according to a magnitude of the control signal $T_{BA}$ and the retardation time of the output voltage of the inverter is also varied according to the time duration of control signal $T_{BA}$.

This causes an error factor with respect to the dead time compensation operation.

On the other hand, in the second preferred embodiment, the equivalent delay in the synthesized voltage always coincides with the delay time in the offset voltage $T_{BO}$ and the rising and falling edges of the synthesized voltage are not varied in time according to the delay control signal $T_{BL}$ as appreciated from FIG. 10(D).

Figure 12:
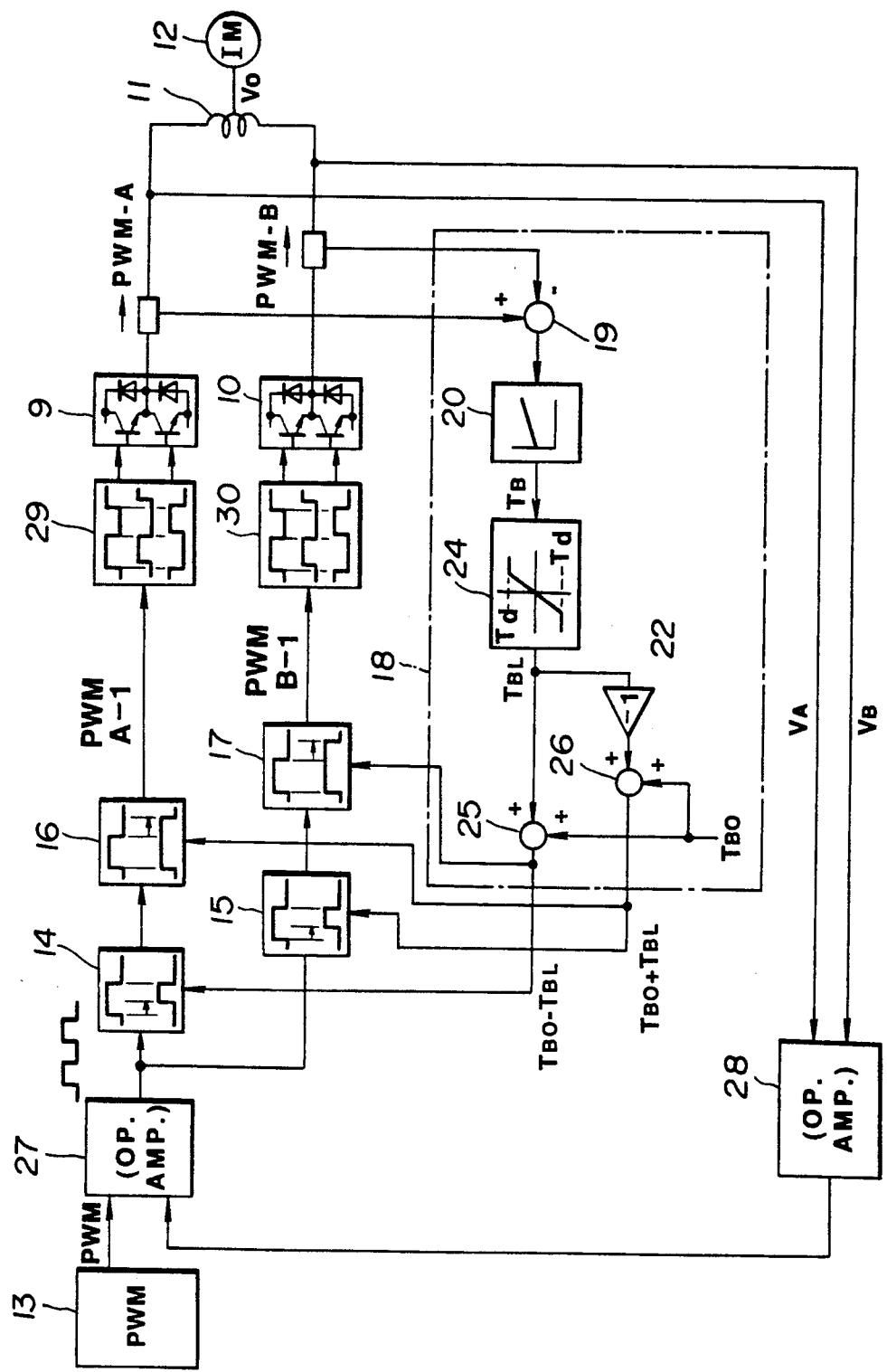
FIG. 12 is a circuit block diagram of a third preferred embodiment of a current balance control circuit according to the present invention.
Figure 13:
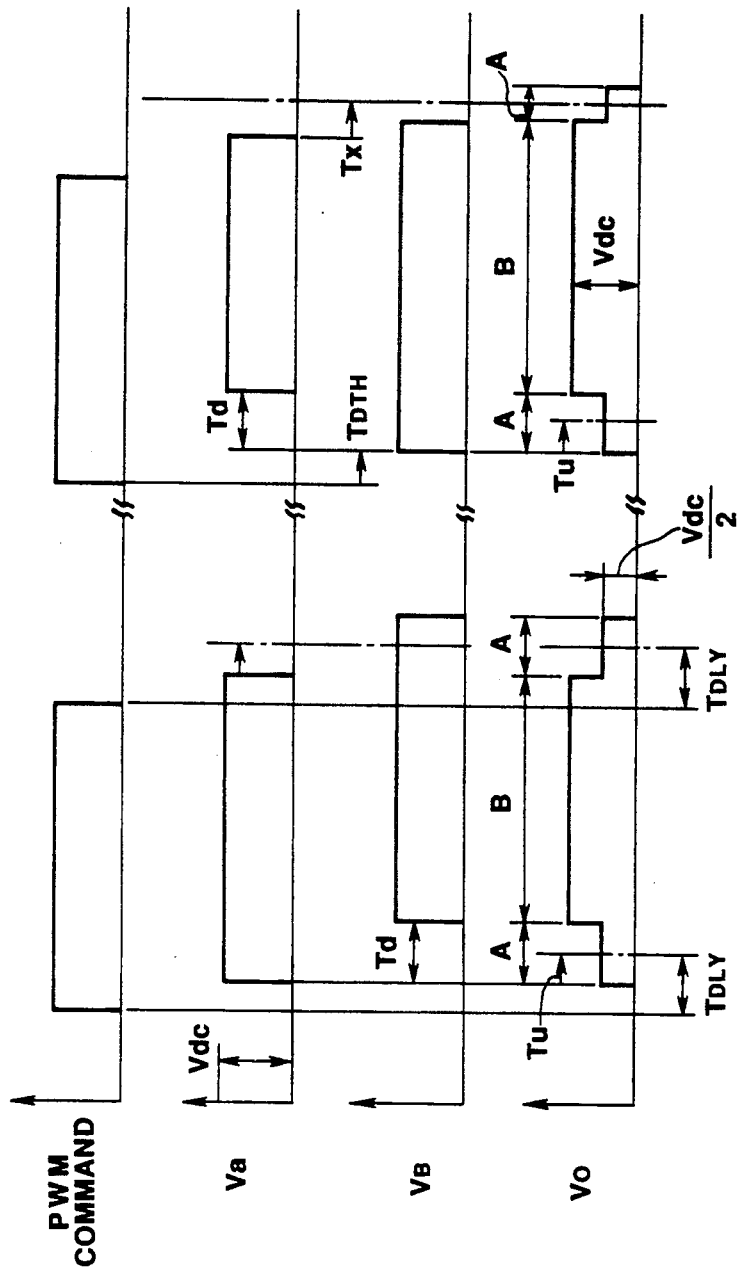
FIG. 13 are waveform charts of error currents flowing the current balance control circuit shown in FIG. 12.

FIG. 12 shows a third preferred embodiment of the current balance control circuit according to the present invention.

In the third preferred embodiment, the dead time compensation is carried out in the current balance control circuit applicable to the parallel running inverters. It is noted that FIG. 12 shows only one phase parallel running inverters.

A dead time compensation circuit (DEAD T. C.) 27 in FIG. 12 carries out a phase comparison between the PWM waveformed pulse train signal PWM and a voltage phase detection signal derived from a voltage detector 28 to provide a dead time compensated PWM waveformed pulse train signal therefrom.

Dead time generators 29, 30 provide gate signals for the main circuits of the inverters 9, 10. Dead times to prevent short-circuiting of upper and lower arms of the main circuits 9, 10 of the inverters are added to the current balance compensated PWM signals PWM-P1 and PWM-B1 from the pulse edge correctors 16, 17.

The dead time compensation operation by means of the dead time compensation circuit 27 will be explained below.

FIGS. 13(A) through 13(D) show a basic theory of operation of the dead time compensation.

The dead time compensation circuit 27 functions as: measuring for each time phase delay time of the synthesized output (the output voltage of the interphase reactor 11) of the output voltage from the inverter units 9, 10 with respect to the PWM waveformed pulse train signal output from the dead time compensation circuit 27 itself and measuring for each time a delay time signal component ($T_U$ or $T_X$) of each circuit 15, 17, 30, and 10; and holding the equivalent phase delay time of the output voltage of the interphase reactor 11 with respect to the PWM pulse derived from the PWM pulse generator 13 using a result of measurements.

In the latter function, the dead time compensation circuit 27 calculates a time of $T_{DTH}-T_U$ when the main circuit switching elements are turned on and a time of $T_{DTH}-T_X$ when the elements are turned off using the delay measured times $T_U$, $T_X$ from the output timing of the circuit 27 to the output timing of the interphase reactor 11.

The dead time compensation circuit 27 delays the PWM waveformed pulse train signal by $T_{DTH}-T_U$ when they are turned on and by $T_{DTH}-T_X$ when they are turned off.

Consequently, if the delay time from the output timing of the signal from the circuit 27 to the output timing of the reactor 11 is added, the output timing of the reactor 11 indicates a time of $T_{DLY}$.

It is noted that since the times $T_U$ and $T_X$ are varied according to current quantity etc. and the times $T_U$ and $T_X$ are measured and corrected for each time of measurement, the output voltage phase of the reactor 11 can be delayed by the time $T_{DLY}$. This prevents a disturbance in waveform stability of the inverter output voltage due to the differences in switching speeds of the switching elements in the inverter main circuits 9, 10.

Although the times $T_U$, $T_X$ are measured for every time of measurement, a delay corresponding to an interval of one PWM waveformed pulse occurs in the dead time compensation. If during this interval of time the values of the times $T_U$ and $T_X$ are changed, this change creates an error in the dead time compensation.

However, in the third preferred embodiment, the delay time due to the current balance of the synthesized voltage can be set to a constant value. Therefore, in the parallel running inverters in which the dead time compensation is carried out, the current balance compensation is also carried out. Then, the delay in the PWM waveformed pulse train signal in which the dead time compensation is carried out with the current balance becomes uniform to each phase so that no influence on a balance in a phase difference of each phase.

Figure 14:
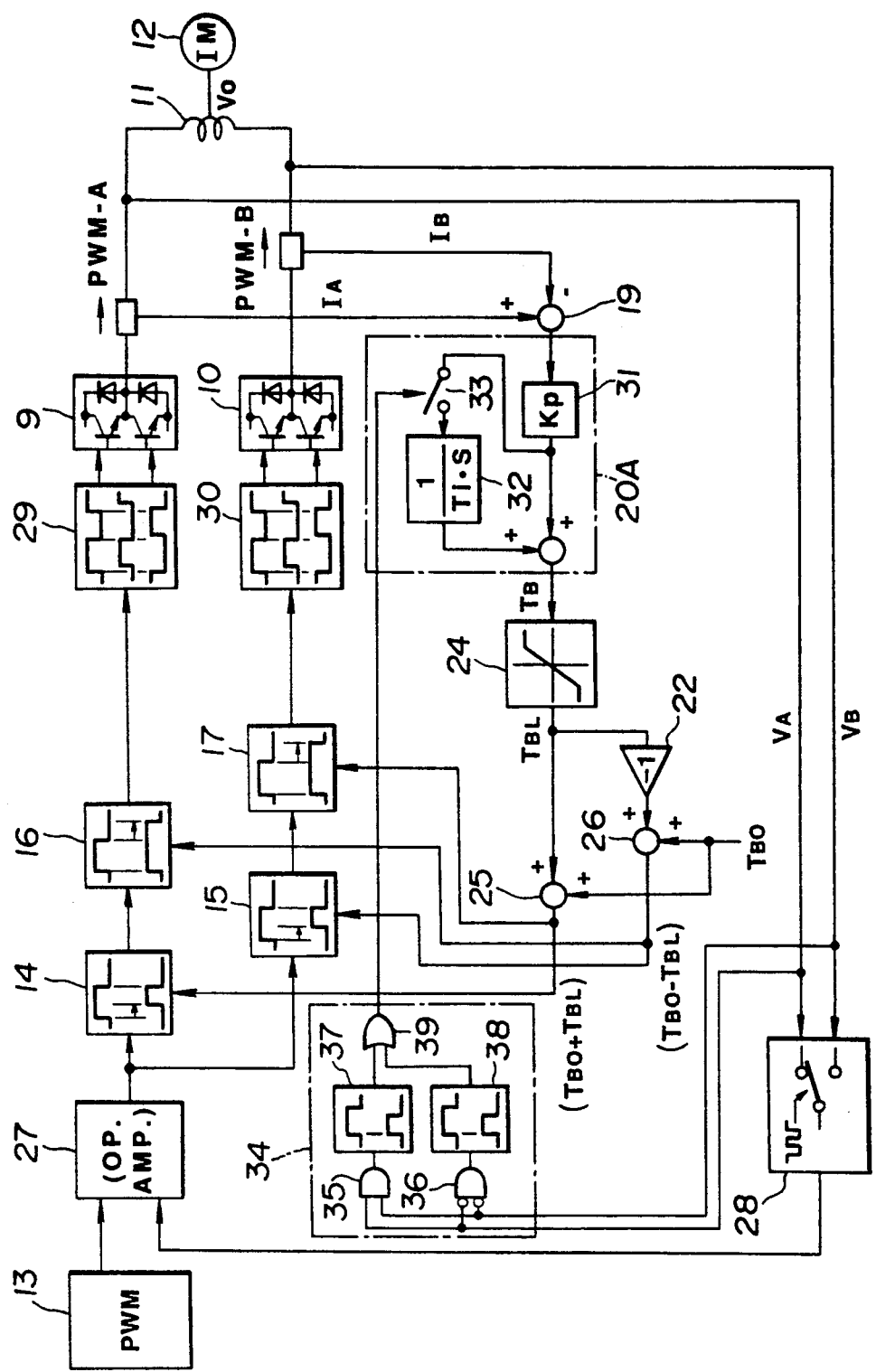
FIG. 14 is a circuit block diagram of a fourth preferred embodiment of a current balance control circuit according to the present invention.

FIG. 14 shows a fourth preferred embodiment of the current balance control circuit according to the present invention.

The difference from the third preferred embodiment shown in FIG. 12 lies in that the deviation control amplifier 20A is separated into a proportional calculating block 31 and integration calculating block 32. The calculation of the integration calculating block 31 is carried out only at a constant time after a change time of the inverter output voltages (the time at which both output voltages of the inverters are changed).

In FIG. 14, a switch 33 carried out an on and off control to enable a calculation of an integration calculating block 32. The on and off control signal is generated from an integration calculation control circuit 34. The integration calculation control circuit 34 receives the pulse signals $V_A$, $V_B$ of the inverter main circuits 9, 10.

Then, an AND gate circuit 35 thereof outputs an ON signal when both inverter main circuits 9, 10 are turned on. In addition, another NAND gate circuit 36 thereof outputs an OFF signal when both of the inverter main circuits 9, 10 are turned off. In response to the ON signal of the AND gate circuit 35, a first pulse signal having a constant duration is derived by means of a monostable multivibrator 37. In response to the OFF signal of the NAND gate circuit 36, a second pulse signal having the same constant duration is derived by means of another monostable multivibrator 38. These first and second pulse signals are supplied to an OR gate circuit 39. Then, the output pulse signal of the OR gate circuit 39 is supplied to the switch 33 which is preferably constituted by an analog switch as its ON drive signal.

In the fourth preferred embodiment in FIG. 14, the deviation control amplifier 20A provides a retard control signal $T_B$ having a duration during which the integration calculation with respect to the current deviation is carried out from a time at which a change of the output voltage of the inverters 9, 10 occurs (from on to off and from on to off) to a time at which the outputs of first and second pulse signals from both multivibrators (timers) 37, 38 are ended. If this integration calculation duration is, e.g., set to correspond to about one period (carrier wave period) of the PWM waveformed pulse train signal, ripples in the current unbalance due to abnormal values of integrated terms caused by a continuous integration can be suppressed since the current unbalance cannot be executed when a pulse defect occurs in the PWM waveformed pulse train signal during a voltage saturation.

The following is an explanation of the above-described ripple suppression.

That is to say, the integration calculating block 32 of the deviation control amplifier 20A is installed to eliminate a steady deviation. Its integration time constant $T_i$ is set with respect to a PWM carrier wave frequency $f_c$ and a maximum value $f_{max}$ of an inverter basic wave frequency as follows:

$$(1/f_c) << T_i << (1/f_{max})$$

It is noted that a set value of the integration constant $T_i$ is largely different between the case where, in a balancing of the inverter output currents, their average currents are equalized to each other and the case where, in the balancing of the inverter output currents, peak instantaneous values of the output currents are equalized to each other.

Figure 15A:
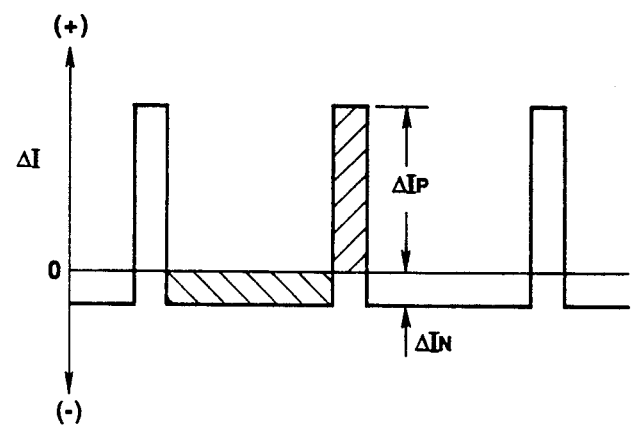
FIGS. 15(A) and 15(B) are waveform charts of error currents in the current balance control circuit shown in FIG. 14.

FIG. 15(A) shows the former case where their average currents are equalized.

As shown in FIG. 15(A), each average value (area denoted by a hatch portion of FIG. 15(A)) of an error current $\Delta I$ ($I_A - I_B$) derived during the integration calculation is made zero.

Figure 15B:
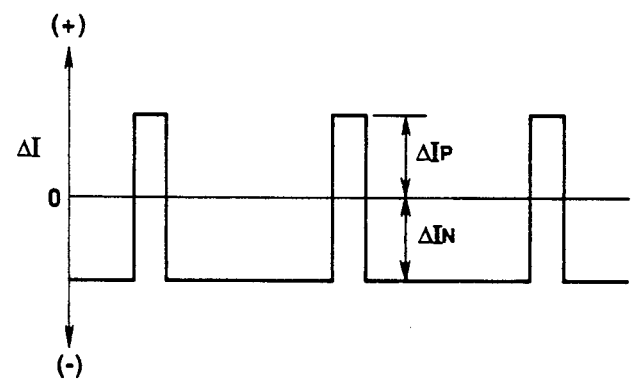

On the other hand, FIG. 15(B) shows the latter case where the instantaneous peak values are equalized.

As shown in FIG. 15(B), the instantaneous peak values $\Delta I\ p$, $\Delta I\ N$ of the error current $\Delta I$ are equalized to each other.

As appreciated from both of FIGS. 15(A), 15(B), the switching elements of the parallel running inverters need to be equally, spontaneously heat sinks when the average current values are equalized and they are difficult to be operated by excessive currents in the respective inverters.

Hence, since, in order to equalize the thermal quantities, average values between the periods more than milliseconds become a major concern. Then, although the integration time constant $T_i$ can be set to a large value, current balance in a microsecond order is required to make the excessive current operation difficult to occur. Consequently, the integration constant $T_i$ must be small.

Therefore, in order to take an assured current balance, a gain of an integration feedback needs to be high. If the pulse defect occurs in the PWM waveformed pulse train signal (an integrator carried out an abnormal integration), the excessive current operation is easy to occur in the correction circuitry.

FIGS. 16(A) through 16(C) show output voltages of the inverter main circuits, error voltage $\Delta I$, retard control signal $T_B$, and pulse train signal $(V_U)$ when the DC power supply voltage is reduced and current balanced state during 180 Hz and 100% load.

As shown in FIG. 16(C), an interval during which the pulse defect occurs appears in a U phase $A_U$ of the pulse train PWM-A.

This is a case where although the pulsewidth is expanded to compensate for the reduction of the DC power supply voltage, too reduction in the DC power supply voltage causes continuous pulse duration to adjacent pulses so that no switching occurs.

Such an occurrence of the pulse defect causes no correction to the error current $\Delta I$ during the duration in which the pulse defect occurs, thus the error generated immediately before the pulse defect occurrence being continued even during the pulse defect occurrence interval.

If the integration calculating block 32 of the deviation control amplifier 20A shown in FIG. 14 continues the integration operation during the pulse defect occurrence interval, the deviation control amplifier output signal $T_B$ becomes accordingly increased due to an accumulation of the errors. Then, an excessive quantity of the error current corrections is generated during the subsequent switching operation in the main circuits so that the integrated output cannot be returned to an originally normal error range.

As described above, if the integration time constant is set to a larger value in order to take the balance for the current average values, the large ripples in the error currents, in turn, becomes increased during the pulse defect occurrence interval and the peak current becomes excessively large.

To cope with the above-described problem, in the fourth preferred embodiment, the integration calculation is continued in the normal driving mode and the integration calculation is halted when the pulse defect is generated so that the average values are balanced and the magnitudes of ripples are reduced.

The halt of the integration in response to the pulse defect occurrence is carried out by the turn off of the switch 33 when no voltage change in the output voltages $V_A$, $V_B$ occurs during the constant duration of the output pulse signals of both monostable multivibrators (timers) 37, 38 from the time at which the changes in detection voltages $V_A$, $V_B$ are ended. If no pulse defect occurs, the switch 33 is continued to be turned on since the monostable multivibrators (retriggerable type) are retriggerred by the subsequently inputting pulses during their output pulse durations and the integration calculation is continued.

Figure 18:
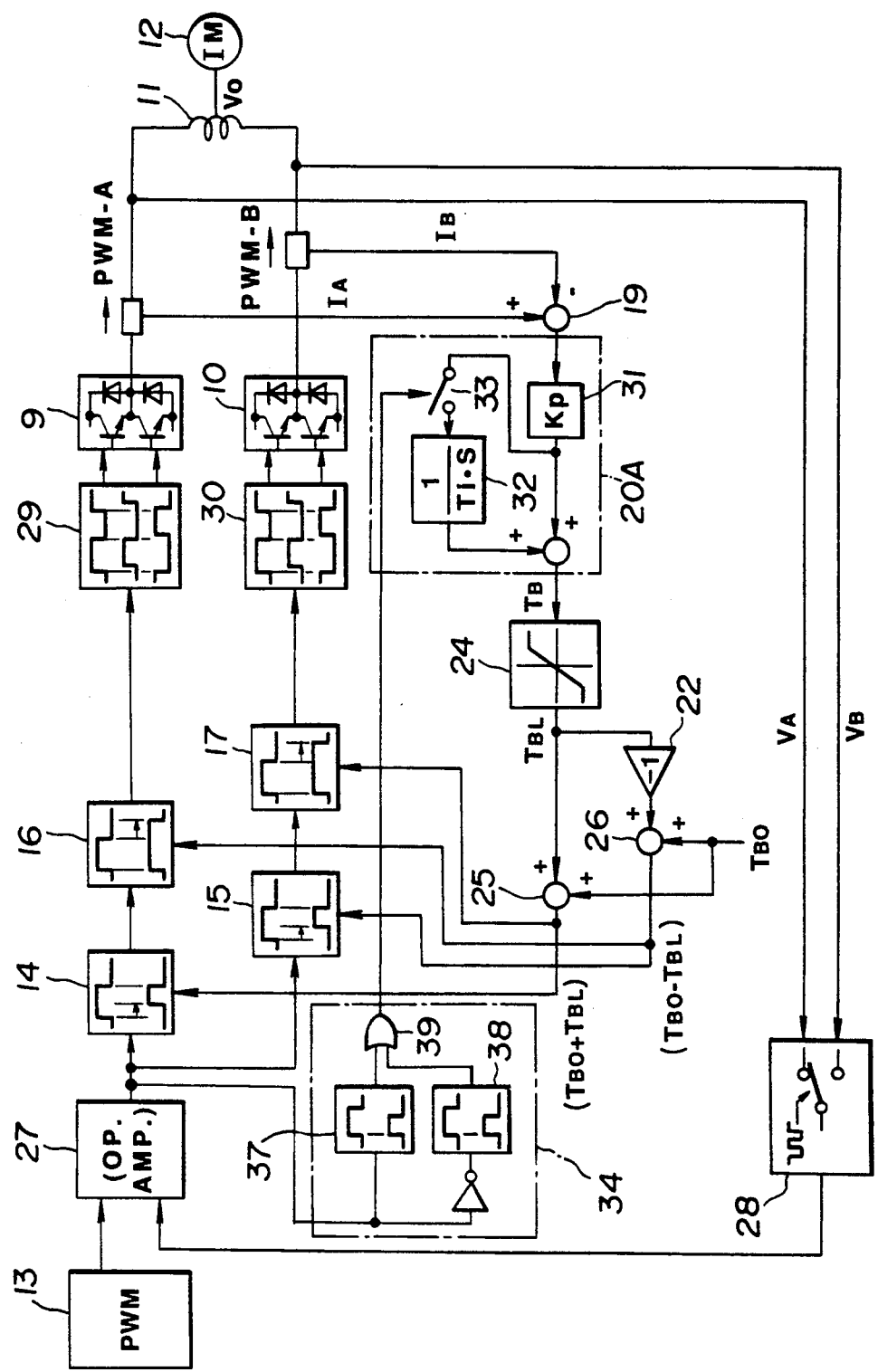
FIG. 18 is a circuit block diagram of a current balancing circuit in a fifth preferred embodiment according to the present invention.

FIG. 18 is a modification of the fourth preferred embodiment in which the ON/OFF signal supplied to the integration calculation enable switch is prepared from a command value in the PWM waveformed pulse train signal.

Figure 17:
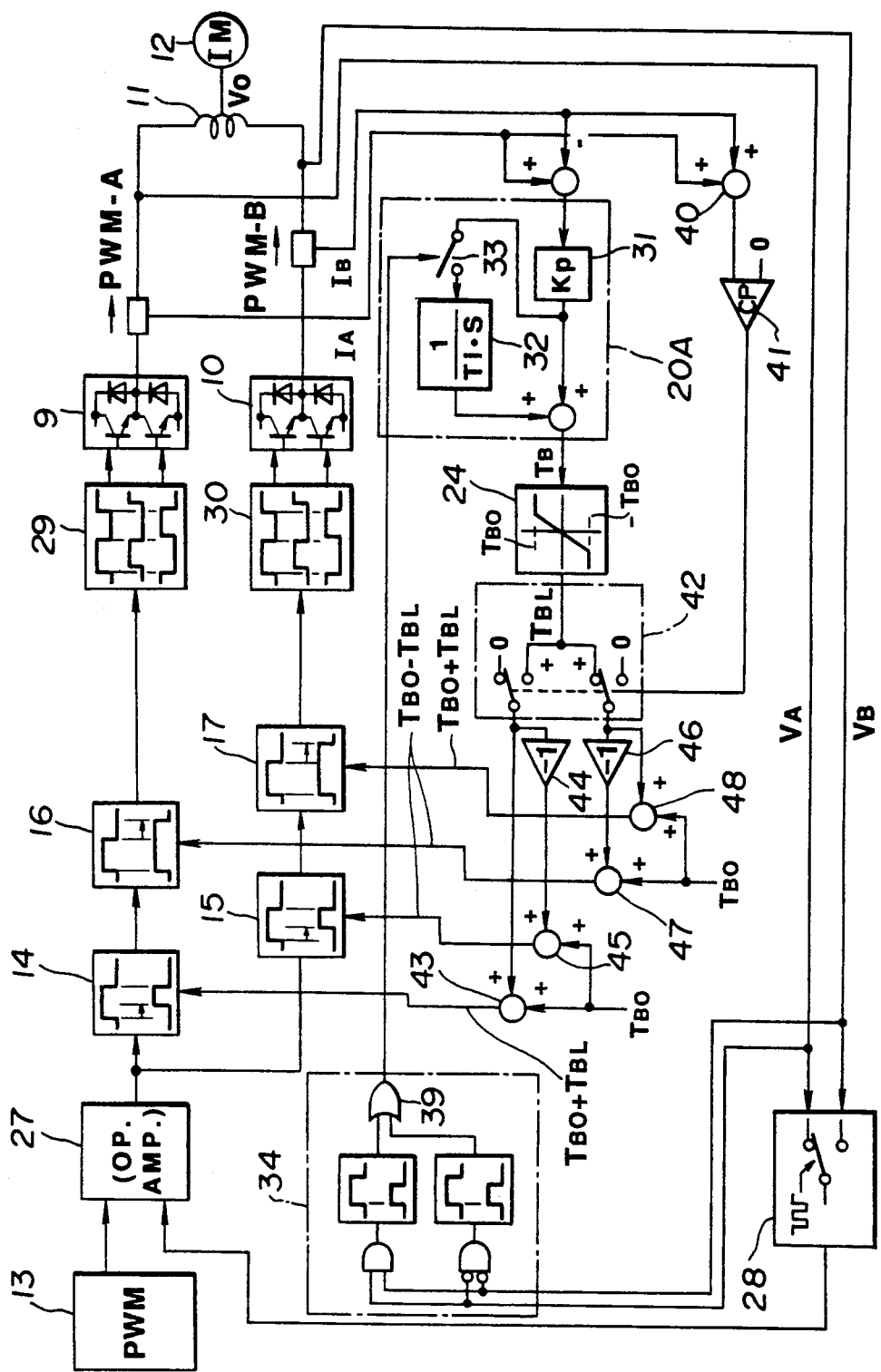
FIG. 17 is a circuit block diagram of a current balance control circuit in a modification of the fourth preferred embodiment shown in FIG. 14 according to the present invention.

FIG. 17 shows a fifth preferred embodiment of the current balance control circuit according to the present invention.

The difference in the fifth preferred embodiment from FIG. 14 lies in that circuit elements 40 through 48 are installed to provide such a circuit operation that a current balance feedback is carried out through one of the falling edge correction or rising edge correction depending on its polarity of the output current.

An adder 40 serves to add both detection currents $I_A$, $I_B$. A comparator 41 serves to determine a plus or minus of a result of addition by the adder 40 so as to derive the determined polarity of the output currents of both inverters.

Two circuit switches 42 is switched in response to the output signal from the comparator so that the output signal $T_{BL}$ of the limiter 24 and zero level signal are switched to derive complementarily via the two circuits.

In addition, one output of the switch 42 is added to the offset signal $T_{BO}$ so as to serve as the correction signal $T_{BO}+T_{BL}$ input to a retardation correction signal 14. In addition, an inverting amplifier 44 is installed so that the addition of the adder 45 is carried out so as to serve as the correction signal $T_{BO}-T_{BL}$ supplied to the correction circuit 15. The other output of the switch 42 is passed through an inverting amplifier 46 so as to receive the addition by an adder 47 to the offset signal $T_{BO}$. The added result is supplied to the correction circuit 16 as the correction signal $T_{BO}-T_{BL}$ and The added result of the adder 48 is supplied to the correction circuit 17 to provide the correction signal $T_{BO}+T_{BL}$.

In the fifth preferred embodiment shown in FIG. 17, the switch 42 is switched according to the polarity of the output current of both inverters. During the positive polarity of the output current, the switched state is shown in FIG. 17 so that the correction signal $T_{BL}$ appears only in the input terminals of the adders 47, 48 so that only falling edge of the PWM waveformed pulse train signal is corrected.

On the contrary, during the negative polarity of the output current of both inverters, the switched state is a reversed state shown in FIG. 17 so that the correction signal $T_{BL}$ appears only at the input terminals of both adders 43, 45 so that only the rising edge of the PWM waveformed pulse train signal.

These corrections permit unnecessary correction and reduction of a retardation of the correction with the ripple components of the current unbalance suppressed.

This can be explained as follows.

Figure 1:
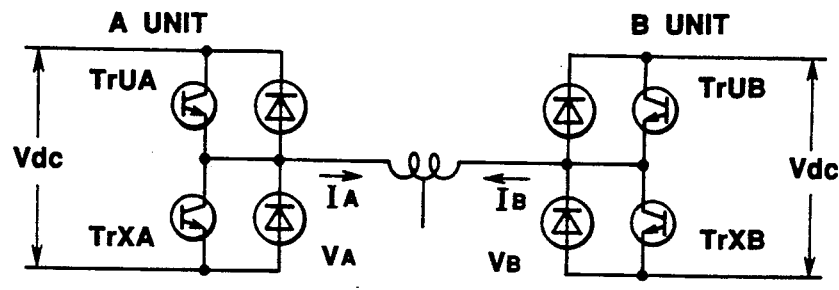
FIG. 1 is a circuit wiring diagram of output circuits of one-phase parallel driven inverters already described in the BACKGROUND OF THE INVENTION.
Figure 4:
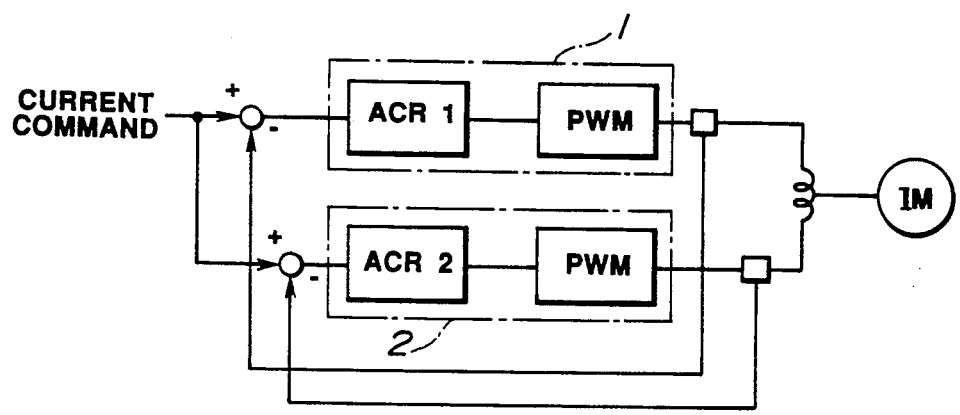
FIG. 4 is a circuit block diagram of a current balance control circuit previously proposed and described in the BACKGROUND OF THE INVENTION.
Figure 5:
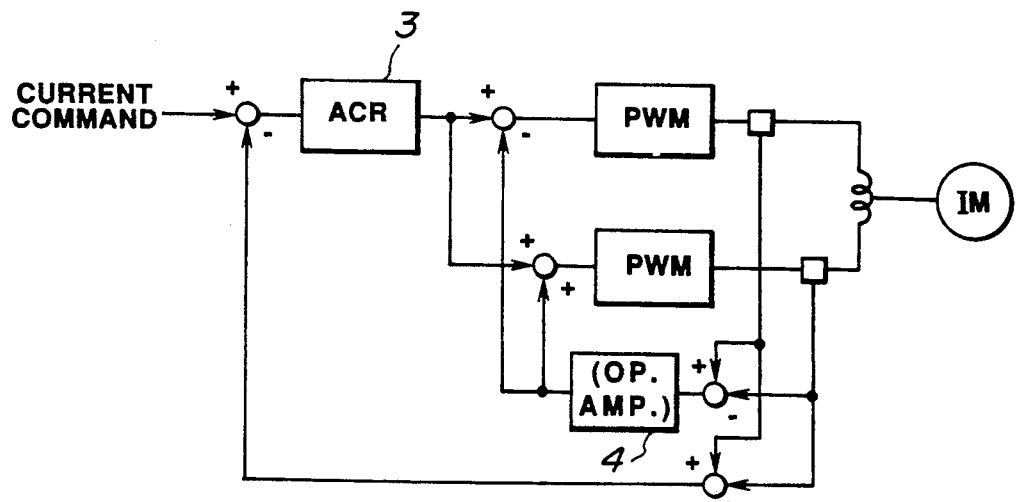
FIG. 5 is a circuit block diagram of another previously proposed current balancing circuit described in the BACKGROUND OF THE INVENTION.
Figure 2:
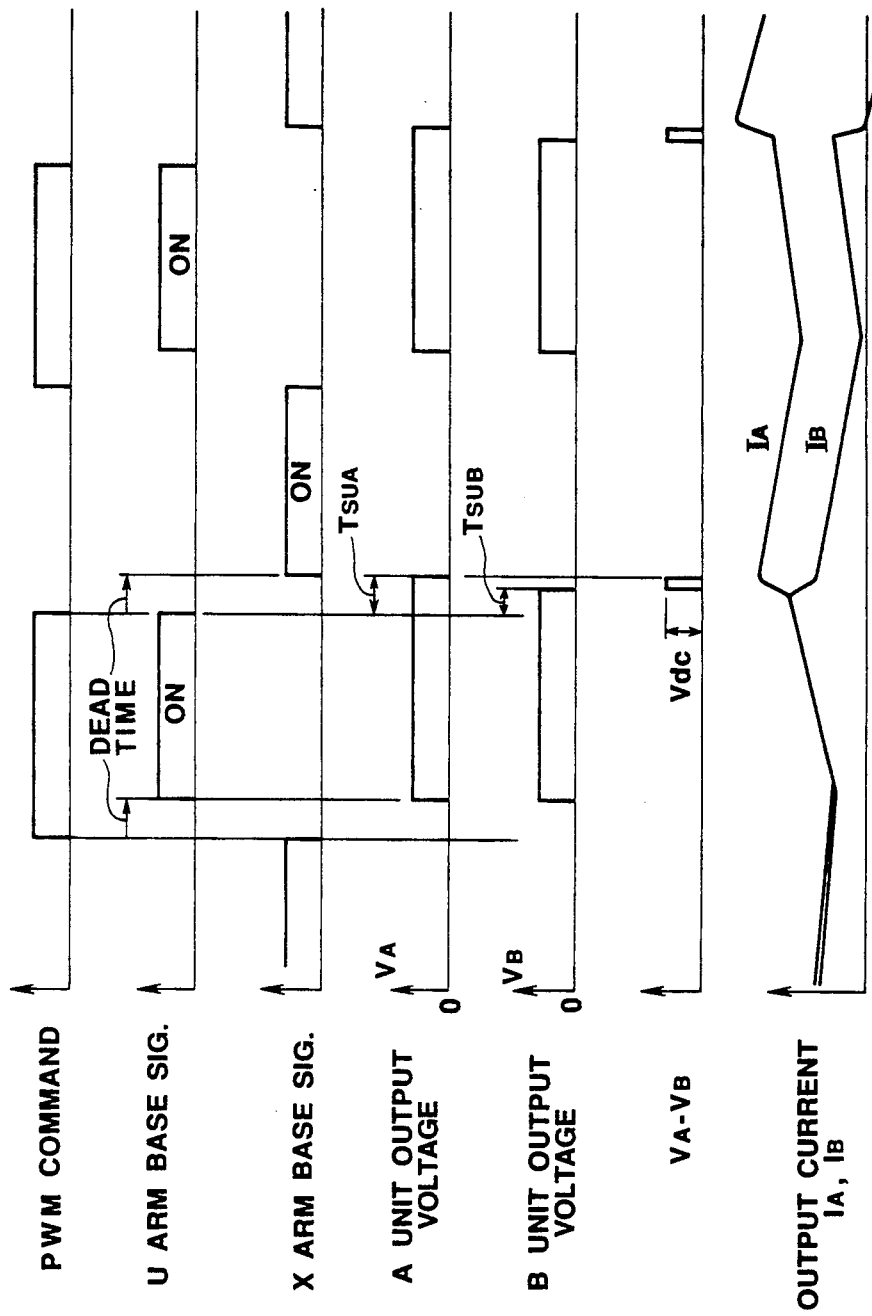
FIG. 2 is waveform timing charts of output current unbalancing state generated due to different storage times in switching elements shown in FIG. 1 when the output currents positively flow as already described in the BACKGROUND OF THE INVENTION.
Figure 3:
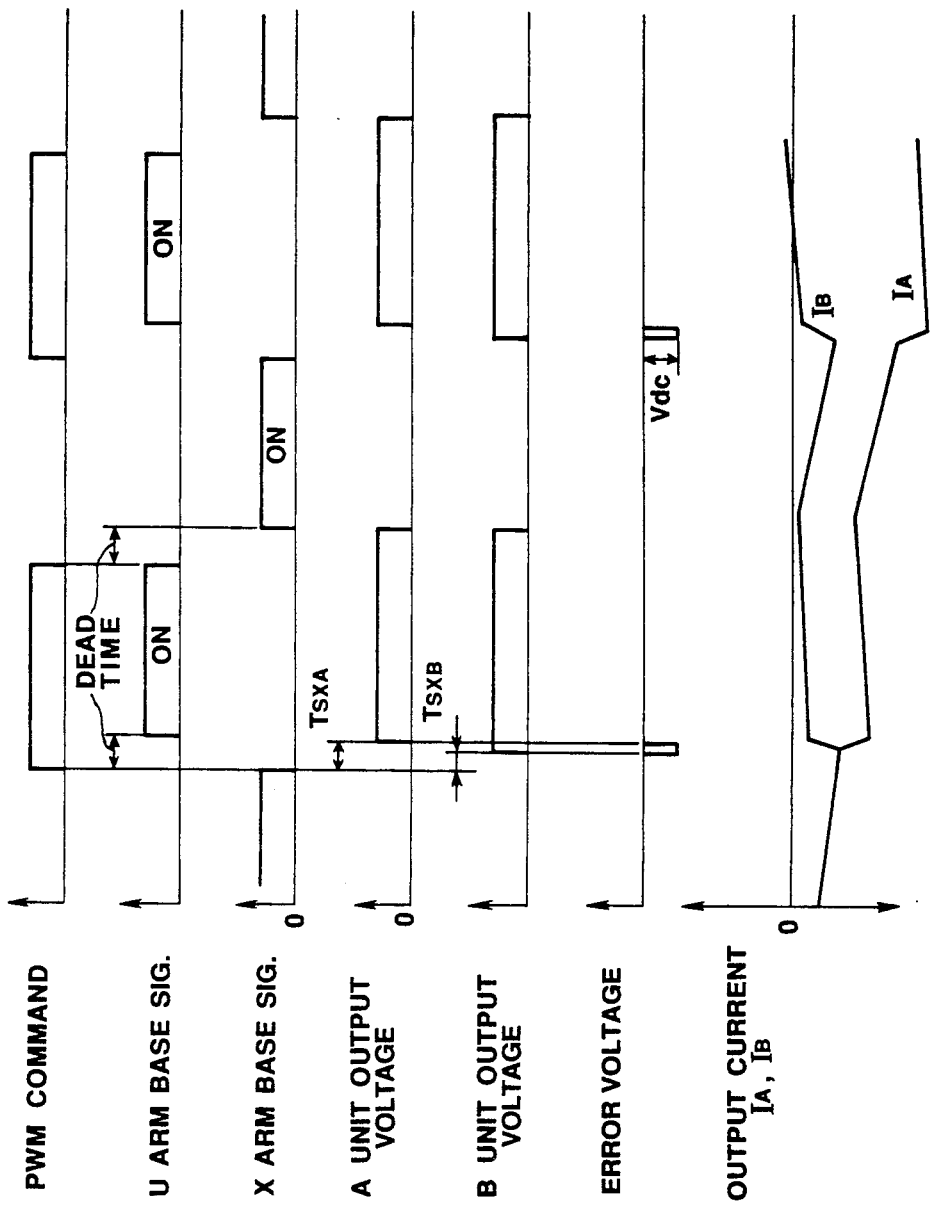
FIG. 3 is waveform timing charts of output currents generated due to different storage times in switching elements shown in FIG. 1 when the output currents negatively flow already described in the BACKGROUND OF THE INVENTION.

As shown in FIGS. 2 and 3 described in the BACKGROUND OF THE INVENTION, the cause of the current unbalance occurrence can be divided into two cases where the PWM waveformed pulse train signal rises and where the PWM waveformed pulse train signal falls depending on whether the inverter output current indicates a plus or minus polarity.

This sources of causes are the difference of the storage times $T_{SUA}$, $T_{SUB}$ of the transistors used in the upper arm of the inverter and the difference of the storage times $T_{SXA}$, $T_{SXB}$. Two independent error causes are present in the respective differences.

On the other hand, to cope with the current unbalance occurrence, the current balance feedback control is carried out by means of the deviation control amplifier 20A. However, in a case where the occurrence of the current unbalance is not present, the current balance control is carried out with the PWM waveformed pulse train signal retarded by the offset time $T_{BO}$. This retardation may increase the current error.

To cope with the above-described deficiency, the balance correction is carried out only during the switching which may cause the current unbalance. Then, if the unbalance cause is not present, no correction is carried out. Consequently, an amplitude of the current unbalance can be reduced.

As described above, in the fifth preferred embodiment, the balance correction is carried out individually at the time at which the switching state is in the on state and in the off state in the inverter main circuits. In addition, the switch 42 is switched to selectively receive the correction signal $T_{BL}$ and zero level signal so that the correction is carried out at the time at which the switching of the inverters is carried out which may cause the current unbalance.

Although, in each preferred embodiment, the current balance control circuitry is applicable to the parallel running inverters, the present invention is applicable to parallel running power converting units such as converters, particularly, the digitalized PWM controlled power converting units.

As described hereinabove, since the PWM waveformed pulse train signal is retardation corrected so that the feedback control is carried out to achieve the current balance with the output current increase in the one of the parallel running units and the output current decrease in the other parallel running unit, the retard control of the PWM waveformed pulse train signal permits the easy application to the digitalized power converting unit.

In addition, since the average values of the retard times in the PWM waveformed pulse train signal becomes constant to carry out the current balance in the present invention, the influence of the current balance control on the current control system or dead time compensation can be prevented. The current balance independent of the ACR control system can be achieved.

Furthermore, in the present invention, the integration calculation of the deviation control amplifier for the current feedback control is limited to the constant period of time from the time at which the power converting units are changed so that the current balance control in which the abnormal unbalance during the pulse defect occurrence interval can be achieved.

It is noted that all embodiments shown in the related drawings are applicable to one phase main circuit of the parallel driven power inverting units and are, of course, applicable to tri-phase main circuits of the parallel driven power inverting units.

In the present invention, the retard correction is carried out only for the rising edge or falling edge of the PWM waveformed pulse train signal depending on the output current polarity of both units, the ripple components of the current unbalance can hardly be reduced.

It will fully be appreciated by those skilled in the art that the foregoing description has been made to the preferred embodiment and various changes and modifications may be made without departing from the scope of the present invention which is to be defined by the appended claims.

What is claimed is:

1. A current balance control circuit for parallel driven PWM-type power inverting units which are connected to each other to supply power to a load, comprising:

a) a PWM pulse generator which generates a PWM pulse train signal and outputs the PWM pulse train signal to each main circuit of the power inverting units, each main circuit thereof outputting a current to the load via an interphase reactor;

b) a pair of series connected retard correction circuits interposed between the PWM pulse generator and each main circuit of the power inverting units, for independently retarding rising edges and falling edges of the PWM pulse supplied to a corresponding one of the main circuits by predetermined retardation times, respectively, in response to each retardation correction signal; and c) a retardation correction signal generator which calculates a proportion and integration of a difference in magnitude between each output current from the main circuits of the power inverting units and generates and outputs one of the retardation correction signals to one of the pair of retard correction circuits so that, when the PWM pulse train signal from the PWM pulse generator to be supplied to the main circuits of the power inverting units rises, a rising edge of the PWM pulse train signal supplied to one of the main circuits of the respective power inverting units which output the current having a value larger than that of the other power inverting unit is retarded by the predetermined retardation time with respect to the rising edge of the PWM pulse train signal to be supplied to the other main circuit of the other inverting unit which outputs the current which is smaller than that of the one power inverting unit and a falling edge of the PWM pulse train signal supplied to the other main circuit of the other power inverting unit which output the current having a value smaller than that of the one power inverting unit is, in turn, retarded by the predetermined retardation time with respect to the falling edge of the PWM pulse train signal to be supplied to the one main circuit of the one inverting unit which outputs the current which is larger than that of the other power inverting unit.

2. A current balance control circuit for parallel driven PWM-type power inverting units which are connected to each other to supply power to a load as set forth in claim 1, wherein said pair of retard correction circuits comprises two series-connected timers, first one of the timers, responsive to each rising edge of the PWM pulse train signal, operated to delay the timing of each rising edge of the PWM pulse train signal by the predetermined retardation time and a second timer, responsive to each falling edge of the PWM pulse train signal, operated to delay the timing of each falling edge by the predetermined retardation time.

3. A current balance control circuit for parallel driven PWM-type power inverting units which are connected to each other to supply power to a load as set forth in claim 2, wherein said retardation correction signal generator outputs the retardation correction signal to both first timer connected to one main circuit of the one power inverting unit which outputs the current larger than that of the other power inverting unit and second timer connected to the other main circuit of the other power inverting unit which outputs the current smaller than that of the one power inverting unit.

4. A current balance control circuit for parallel driven PWM-type power inverting units which are connected to each other to supply power to a load as set forth in claim 3, wherein said retardation correction circuit includes: a) a pair of current sensors for detecting a direction and magnitude of output currents $I_A$, $I_B$ supplied to the interphase reactor; b) a deviation detector for detecting a deviation between the detected output currents $I_A$, $I_B$ and its polarity of the deviation and outputting a signal indicating the deviation and polarity; c) a deviation control amplifier which calculates the proportion and integration (PI) from the output signal from the deviation detector and derives a retardation control signal $T_B$ according to a result of proportion and integration calculations; d) a first positive polarity amplifier which derives a value proportional to the retardation control signal $T_B$ only when the retardation control signal indicates a positive polarity and outputs the retardation correction signal $T_{BA}$ to both first timer connected to the one main circuit and second timer connected to the other main circuit according to the value derived therefrom; e) an inverting amplifier which inverts the polarity of the retardation control signal $T_B$; and e) a second positive amplifier which derives a value proportional to the retardation control signal $T_B$ only when an output signal of the inverting amplifier which indicates a positive polarity of the retardation control signal $T_{BB}$ and outputs the retardation correction signal $T_{BB}$ to both first timer connected to the other main circuit and second timer connected to the one main circuit.

5. A current balance control circuit for parallel driven PWM-type power inverting units which are connected to each other to supply power to a load as set forth in claim 3, wherein said retardation correction circuit includes: a) a pair of current sensors for detecting a direction and magnitude of output currents $I_A$, $I_B$ supplied to the interphase reactor; b) a deviation detector for detecting a deviation between the detected output currents $I_A$, $I_B$ and its polarity of the deviation and outputting a signal indicating the deviation and polarity; c) a deviation control amplifier which calculates the proportion and integration (PI) from the output signal from the deviation detector and derives a retardation control signal $T_B$ according to a result of proportion and integration calculations; d) a limiter circuit for limiting the retardation control signal between both upper and lower limit values and deriving a retardation control signal $T_{BL}$; e) an offset signal generator which provides an offset signal $T_{BO}$ having a constant duration; e) an inverting amplifier which inverts the retardation control signal $T_{BL}$; f) a first adder which adds the offset signal $T_{BO}$ to the retardation control signal $T_{BL}$ and outputs the added signal $T_{BO}+T_{BL}$ to both first timer connected to the one main circuit and second timer connected to the other main circuit; g) a second adder which adds the offset signal $T_{BO}$ to the inverted retardation control signal $-T_{BL}$ and outputs the added signal $T_{BL}-T_{BL}$ to both first timer connected to the other main circuit and second timer connected to the one main circuit.

6. A current balance control circuit for parallel driven PWM-type power inverting units which are connected to each other to supply power to a load as set forth in claim 5, which further includes: a) a voltage phase detector which detects a voltage phase difference between an output voltage $V_A$ from the one main circuit and an output voltage $V_B$ from the other main circuit and output the voltage phase difference signal; b) a dead time compensation circuit which compares both PWM pulse train signal from the PWM pulse generator as a reference and the voltage phase difference signal $V_{dc}$ and outputs the dead time compensated PWM pulse train signal to both first timers; c) a first dead time compensation circuit interposed between said second timer and the one main circuit for providing a first gate signal in which a dead time is added to prevent a short-circuiting between upper and lower arms of the one main circuit for the current balance compensated PWM pulse train signal PWM-A1 passed through said second timer; d) a second dead time compensation circuit interposed between said second timer and the other main circuit for providing a second gate signal in which a dead time is added to prevent a short-circuiting between upper and lower arms of the other main circuit for the current balance compensated PWM pulse train signal PWM-B1 passed through said second timer.

7. A current balance control circuit for parallel driven PWM-type power inverting units which are connected to each other to supply power to a load as set forth in claim 6, wherein said deviation control amplifier includes: a) a switch which is closed in response to a drive signal; b) an proportional amplifier which calculates a proportion of the detected deviation signal from the deviation detector; c) an integrator which integrates the output proportion signal from the proportional amplifier with respect to a predetermined time $T_i$ via the switch; and an adder which adds the integrated signal to the proportional signal to derive the retardation control signal $T_B$ and which further includes a drive signal generator which receives the output voltage $V_A$, $V_B$ of the respective main circuits and outputs the drive signal depending on whether either of the output voltages $V_A$, $V_B$ rises.

8. A current balance control circuit for parallel driven PWM-type power inverting units which are connected to each other to supply power to a load as set forth in claim 7, wherein said drive signal generator comprises: an AND gate circuit which takes a logical AND between the output voltages $V_A$, $V_B$ of both main circuits and outputs the ANDed signal; a NAND gate circuit which receives both output voltages $V_A$, $V_B$ of both main circuits and outputs a NAND signal which indicates that neither voltages is present; a first monostable multivibrator which in response to the AND signal outputs the drive signal having a predetermined duration; a second monostable multivibrator which in response to the NAND signal outputs the drive signal having the same predetermined duration; and an OR gate circuit which outputs the drive signals from both monostable multivibrators to said switch as the drive signal.

9. A current balance control circuit for parallel driven PWM-type power inverting units which are connected to each other to supply power to a load as set forth in claim 7, wherein said drive signal generator comprises: a first monostable multivibrator which in response to the dead time compensated PWM pulse train signal outputs the drive signal having a predetermined duration; an inverter which in response to the dead time compensated PWM pulse train signal inverts the dead time compensated PWM pulse train signal; a second monostable multivibrator which in response to the inverted dead time compensated PWM pulse train signal outputs the drive signal having the same predetermined duration; and an OR gate circuit which takes a logical OR of both drive signals and output the drive signals as the drive signal to said switch.

10. A current balance control circuit for parallel driven PWM-type power inverting units which are connected to each other to supply power to a load as set forth in claim 8, which further includes: a first adder which adds the one output current $I_A$ to the other output current $I_B$; a first comparator which compares the added output current value with a zero level to determine a polarity of both output currents; two-circuit cooperating switches in response to an output signal of the comparator which switches to zero level for one of the cooperating switches and switches to the output of the limiter for the other switch in response to the output signal of the first comparator indicating either of the polarities of the output currents; a second adder which adds the output signal from one of the cooperating switches to the offset signal $T_{BO}$ and outputs the added signal $T_{BO}+T_{BL}$ to said first timer connected to said first gate signal generator; a first inverter which inverts the output signal of the one cooperating switch; a third adder which adds the inverted output signal from the first inverter to the offset signal and outputs the added signal $T_{BO}-T_{BL}$ to said first timer connected to said second gate signal generator; a second inverter which inverts the output signal of the other cooperating switch; a fourth adder which adds the inverted signal of the other cooperating switch to the offset signal and outputs the added signal $T_{BO}-T_{BL}$ to said second timer connected to said first gate signal generator; a fifth adder which adds the output signal of the other cooperating switch to the offset signal and outputs the added signal $T_{BO}+T_{BL}$ to said second timer connected to said second gate signal generator.

11. A method for controlling an output current balancing for parallel driven PWM type power inverting units, comprising the steps of:
a) retarding a rising edge and falling edge of a PWM pulse train signal to be supplied to respective main circuits using respectively independent retardation correction signals to form respective PWM control signals for the respective main circuits;
b) calculating a proportion and integration of a deviation between output currents of the respective main circuits; and
c) generating the respectively independent correction signals according to a result of calculation of the proportion and integration so that a rising edge retardation time of the one PWM control signal to be supplied to the one main circuit which outputs the output current larger than that output from the other main circuit is made longer than that of the other PWM control signal to be supplied to the other main circuit which outputs the output current smaller than that of the one PWM main circuit when the PWM pulse train signal rises and a falling edge retardation time of the one PWM control signal to be supplied to the one main circuit which outputs the output current larger than that output from the other main circuit is made shorter than that of the other PWM control signal to be supplied to the other main circuit which outputs the current which is smaller than that of the one main circuit.

12. A method for controlling an output current balancing for parallel driven PWM type power inverting units as set forth in claim 11, wherein the step c) includes the steps of:
d) deriving an added value between the offset signal and the result of the proportion and integration in the step b) and a subtracted value between the offset signal and the result of the proportion and integration in the step b);
e) retarding the rising edges of the PWM control signal to be supplied to the one main circuit which outputs the current larger than that of the other main circuit by means of the added value and retarding the falling edges of the PWM control signal to be supplied to the one main circuit which outputs a smaller current by means of the added value; and
f) retarding the rising edges of the PWM control signal to be supplied to the one main circuit which outputs the larger current and retarding the falling edges of the PWM control signal to be supplied to the other main circuit which outputs the smaller current by means of the subtracted value.

13. A method for controlling an output current balancing for parallel driven PWM type power inverting units as set forth in claim 12, which further comprises the step of:
g) comparing an output voltage phase of each main circuit with a phase of the PWM control signal so as to compensate a dead time for the PWM control signal to be supplied to each main circuit.

14. A method for controlling an output current balancing for parallel driven PWM type power inverting units as set forth in claim 12, which further includes the step of:
h) deriving a delay signal having a constant duration either when a change in both output voltages of the respective main circuits indicating on to off occurs or when a change in a PWM command from on to off occurs; and
i) operating the integration calculation of the step b) only during the constant duration of the delay signal.

15. A method for controlling an output current balancing for parallel driven PWM type power inverting units as set forth in claim 11, wherein said step c) includes the steps of:
j) adding the result of proportion and integration calculations of the deviation between output currents of the respective main circuits to an offset signal only during a negative polarity indicating interval of time of the output current derived from one of the main circuits which outputs the larger current so as to retard the rising edges of the PWM control signal to be supplied to the one main circuit which output the larger current; and
k) adding the result of proportion and integration calculations of the deviation between output currents of the respective main circuits to an offset signal only during a positive polarity indicating interval of time of the output current derived from the other main circuit which outputs the smaller current so as to retard the falling edges of the PWM control signal to be supplied to the other main circuit which outputs the smaller current.

* * * * *